United States Patent
Shveidel (10) Patent No.: US 10,922,147 B2
(45) Date of Patent: Feb. 16, 2021

(54) STORAGE SYSTEM DESTAGING BASED ON SYNCHRONIZATION OBJECT WITH WATERMARK

(71) Applicant: EMC IP Holding Company LLC, Hopkinton, MA (US)

(72) Inventor: Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 224 days.

(21) Appl. No.: 16/039,902

(22) Filed: Jul. 19, 2018

(65) Prior Publication Data
US 2020/0026582 A1    Jan. 23, 2020

(51) Int. Cl.
*G06F 9/52*   (2006.01)
*G06F 3/06*   (2006.01)
*G06F 9/48*   (2006.01)

(52) U.S. Cl.
CPC ............ *G06F 9/526* (2013.01); *G06F 3/0656* (2013.01); *G06F 9/4881* (2013.01)

(58) Field of Classification Search
None
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 9,104,326 B2 | 8/2015 | Frank et al. |
| 9,208,162 B1 | 12/2015 | Hallak et al. |
| 9,286,003 B1 | 3/2016 | Hallak et al. |
| 9,606,870 B1 | 3/2017 | Meiri et al. |
| 9,716,754 B2 | 7/2017 | Swift |
| 2008/0279462 A1 | 11/2008 | Celi, Jr. |
| 2009/0132955 A1 | 5/2009 | Garg et al. |
| 2010/0179941 A1 | 7/2010 | Agrawal et al. |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Eric C Wai
(74) *Attorney, Agent, or Firm* — Ryan, Mason & Lewis, LLP (57) ABSTRACT

A storage system includes a plurality of storage devices, a data structure, and a storage controller that is configured to obtain a threshold value for a synchronization object associated with the data structure. The storage controller is further configured to activate a plurality of threads. Each thread is configured to determine a count value of the synchronization object corresponding to a number of entries in the data structure and determine whether the count value of the synchronization object exceeds the threshold value plus a predetermined number of entries. In response to determining that the count value of the synchronization object exceeds the threshold value plus the predetermined number of entries, the thread is configured to perform an action.

20 Claims, 5 Drawing Sheets

(56) References Cited

U.S. PATENT DOCUMENTS

| | | | |
|---|---|---|---|
| 2013/0325824 A1 | 12/2013 | Shoens | |
| 2014/0181016 A1 | 6/2014 | Whitehead et al. | |
| 2014/0379988 A1* | 12/2014 | Lyakhovitskiy | G06F 12/12 711/133 |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2017/0192857 A1 | 7/2017 | Meiri et al. | |
| 2017/0351441 A1* | 12/2017 | Marinescu | G06F 3/065 |

OTHER PUBLICATIONS

EMC Corporation, "Unstoppable Data Reduction: Always-on, In-Line, Zero-Penalty, Enterprise-Class, Free," store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

STORAGE SYSTEM DESTAGING BASED ON SYNCHRONIZATION OBJECT WITH WATERMARK

FIELD

The field relates generally to information processing systems, and more particularly to storage in information processing systems.

BACKGROUND

In many information processing systems, volatile write cache temporarily stores or caches data to be later written to a persistent data storage location (i.e., destaged) by a background destaging thread. In such systems, the background destaging functionality ensures that the write cache maintains a sufficient number of free entries to handle ongoing input/output (IO) requests by destaging the write cache when the number of entries in the write cache exceeds a threshold value, e.g., a watermark. This indicates that the number of free entries in the write cache has fallen below a predetermined level sufficient to handle the ongoing IO requests. However, conventional approaches using watermarks can be problematic.

SUMMARY

Illustrative embodiments provide techniques for improved data processing in a storage system.

For example, in one embodiment, a storage system includes a plurality of storage devices and a data structure associated with at least one of the plurality of storage devices. The storage system also includes a storage controller associated with the data structure and the plurality of storage devices. The storage controller is configured to obtain a threshold value for a synchronization object associated with the data structure. The storage controller is further configured to activate a plurality of threads. Each thread is configured to determine a count value of the synchronization object corresponding to a number of entries in the data structure and determine whether the count value of the synchronization object exceeds the threshold value plus a predetermined number of entries. In response to determining that the count value of the synchronization object exceeds the threshold value plus the predetermined number of entries, the thread is configured to perform an action.

In some embodiments, access to the synchronization object may be restricted to one of the threads at a time.

A given thread of the plurality of threads may be further configured to suspend in response to determining that the count value of the synchronization object does not exceed the threshold value plus the predetermined number of entries.

In some embodiments, the storage controller may be further configured to update the count value of the synchronization object and wake up the given thread in response to the update of the count value of the synchronization object. The given thread may be further configured to determine the count value of the synchronization object, determine whether the count value of the synchronization object exceeds the threshold value plus the predetermined number of entries, and perform the action on the data structure in response to determining that the count value of the synchronization object exceeds the threshold value plus the predetermined number of entries.

In some illustrative embodiments, the data structure may be a cache storing data to be written to at least one of the plurality of storage devices and the plurality of threads may comprise a plurality of destager threads. Performing the action on the data structure in these embodiments may comprise at least one of the destager threads destaging a number of entries of the cache equal to the predetermined number of entries and updating the count value of the synchronization object in response to the destaging.

Updating the count value of the synchronization object in response to the destaging may comprise decrementing the count value of the synchronization object by the predetermined number of entries.

In some embodiments, the storage controller may be further configured to receive a write IO request from a host device, add at least one entry to the cache based on the received write IO request, and increment the count value of the synchronization object by an amount corresponding to the number of entries added to the cache based on the received write IO request.

These and other illustrative embodiments include, without limitation, apparatus, systems, methods and processor-readable storage media.

DETAILED DESCRIPTION

In some systems, destaging the write cache by comparing a destager queue counter value to a watermark can cause idle spinning and race conditions in the system which reduce destager efficiency and performance. For example, if multiple destager threads are activated and read the destager queue counter value at the same time, multiple destaging processes may occur where the number of entries in the cache may be reduced well below the watermark level or even to zero. In some cases, idle spinning or race conditions may cause the destager to behave in an unpredictable or irregular manner including jittering. These and other related destaging inefficiencies can significantly undermine system performance.

Synchronization objects such as semaphores are used to control access to a common resource used by multiple processes. Typically, a synchronization object includes a variable that is incremented, decremented, or toggled depending on the particular use case. A processing thread that wishes to perform an action on the common resource typically checks the variable of the synchronization object against predefined criteria to determine whether the action can be performed. If the synchronization object variable does not meet the criteria, the processing thread may wait, e.g., be added to a wait queue of the synchronization object, until a state of the synchronization object changes and the criteria is met.

Illustrative embodiments provide techniques that implement a synchronization object that controls when destaging threads perform a destaging process on a cache. The synchronization object may, for example, be accessed by a destager thread when the destager thread activates to determine whether to destage the cache. For example, the synchronization object may be configured such that a destager thread will destage the write cache in response to a count value of the synchronization object being above a threshold value, e.g., a watermark level, plus a predetermined number of entries, e.g., a batch size number of entries that would be destaged by a single destaging thread.

If these criteria are not met when the destager thread accesses the synchronization object, the destager thread may wait on the synchronization object until these criteria are met. For example, the destager thread may be added to a wait queue associated with the synchronization object. The destager thread may wake up when the synchronization object experiences a change in state or other action, e.g., in response to an increment or decrement to the count value of the synchronization object, in response to the criteria being met, in response to the synchronization object being accessed by another thread that wakes up the destager thread, etc.

When the criteria are met, the destaging thread may remove the predetermined number of entries from the write cache and may also decrement the count value of the synchronization object, e.g., by the predetermined number of entries, such that when the another destaging thread accesses the synchronization object, the count value of the synchronization object reflects the destaging performed by the previous destaging thread. For example, the check against the count value and the decrement of the count value may be performed atomically, e.g., within the framework of a single operation.

This solution provides for a more efficient destaging process and improves performance of the information processing system by inhibiting idle spinning, race conditions, and jittering. For example, the use of the synchronization object ensures that the destage threads will destage only when the threshold value, e.g., watermark, is met and there are sufficient entries above the threshold value for the destage thread to process, e.g., by an amount equal to the batch size number of entries that will be destaged by a single destager thread. The use of the synchronization object also ensures that multiple destager threads do not destage at the same time when only the predetermined number of entries, e.g., the batch size for the destage process, over the threshold value are present since they will be added to the wait queue of the synchronization object and will activate or wake up in order to check the criteria.

While described above with respect to destaging functionality for a cache, the synchronization object with watermark functionality disclosed herein may be utilized in other aspects of a storage system or any other system requiring access controls for common resources. As an example, any common resource for which it is desirable to reach or maintain a threshold number of entries before any action is taken and in addition to take action on a predetermined number of the entries without the action causing the common resource to fall significantly below the threshold number of entries may utilize the disclosed synchronization object with watermark functionality. For example, the synchronization object with watermark functionality may be used for common resources including, e.g., cache of the storage system, journals of the storage system, or for synchronization of any other common resource, data structure, memory space, or in other similar contexts.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
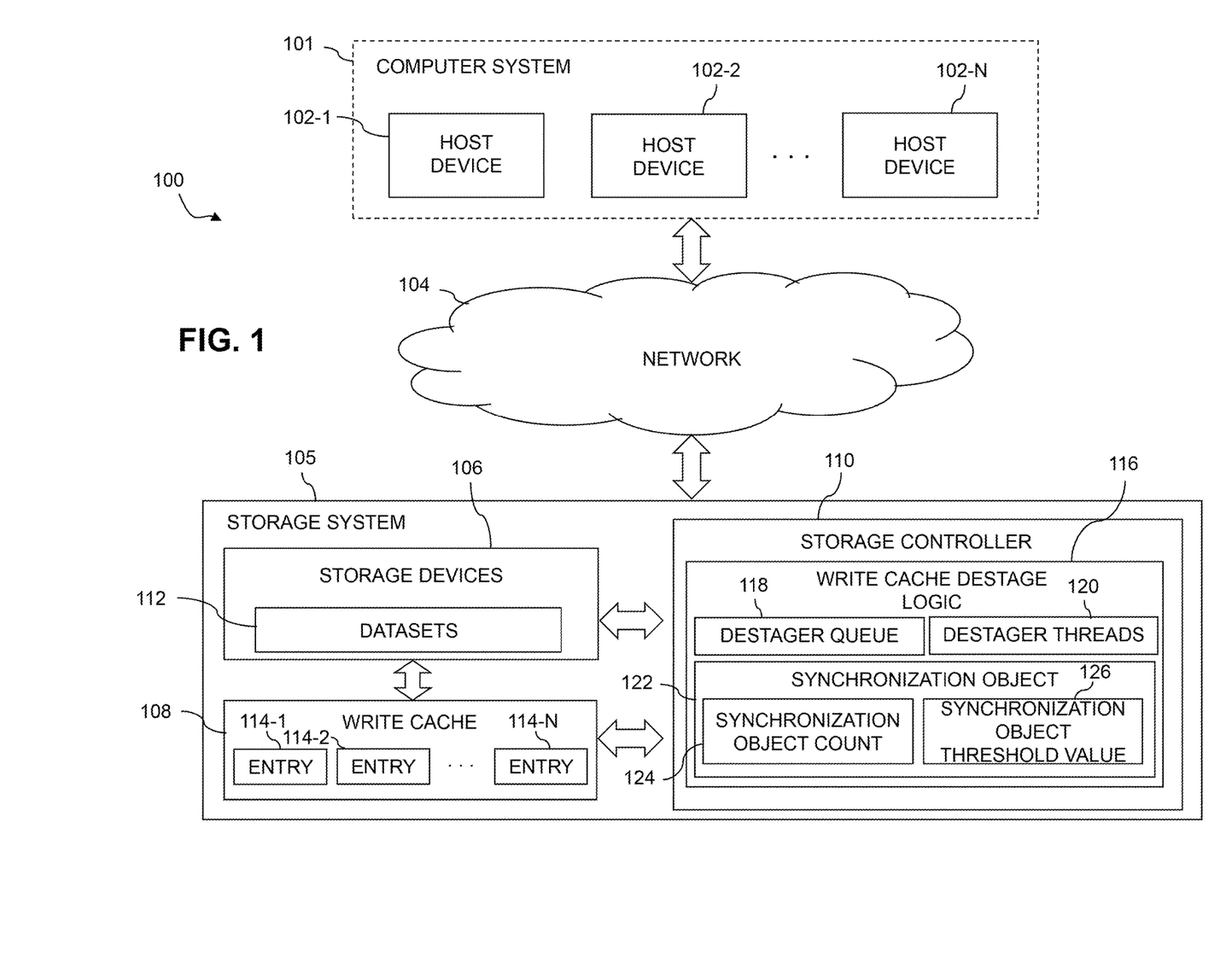
FIG. 1 is a block diagram of an information processing system comprising a storage system configured with functionality for performing destaging logic in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106, an associated write cache 108, and an associated storage controller 110. The storage devices 106 store datasets 112, which may comprise logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity198, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The write cache 108 of storage system 105 in the FIG. 1 embodiment includes entries 114-1, 114-2, ..., 114-N which store incoming IO request data for later destaging to storage devices 106. Write cache 108 may illustratively comprise volatile memory such as, e.g., random access memory (RAM), dynamic random-access memory (DRAM), static random-access memory (SRAM), or any other kind of volatile memory. In some embodiments, write cache 108 may additionally or alternatively comprise any non-volatile memory as described above with respect to storage devices 106. In some embodiments, write cache 108 may be included as a portion of a generic cache supporting other kinds of operations or functions of storage system 105 including, e.g., read cache, temporary metadata storage, or other similar operations. While illustrated as a separate component of storage system 105, in some embodiments, write cache 108 may be included as a component of storage controller 110.

Figure 2:
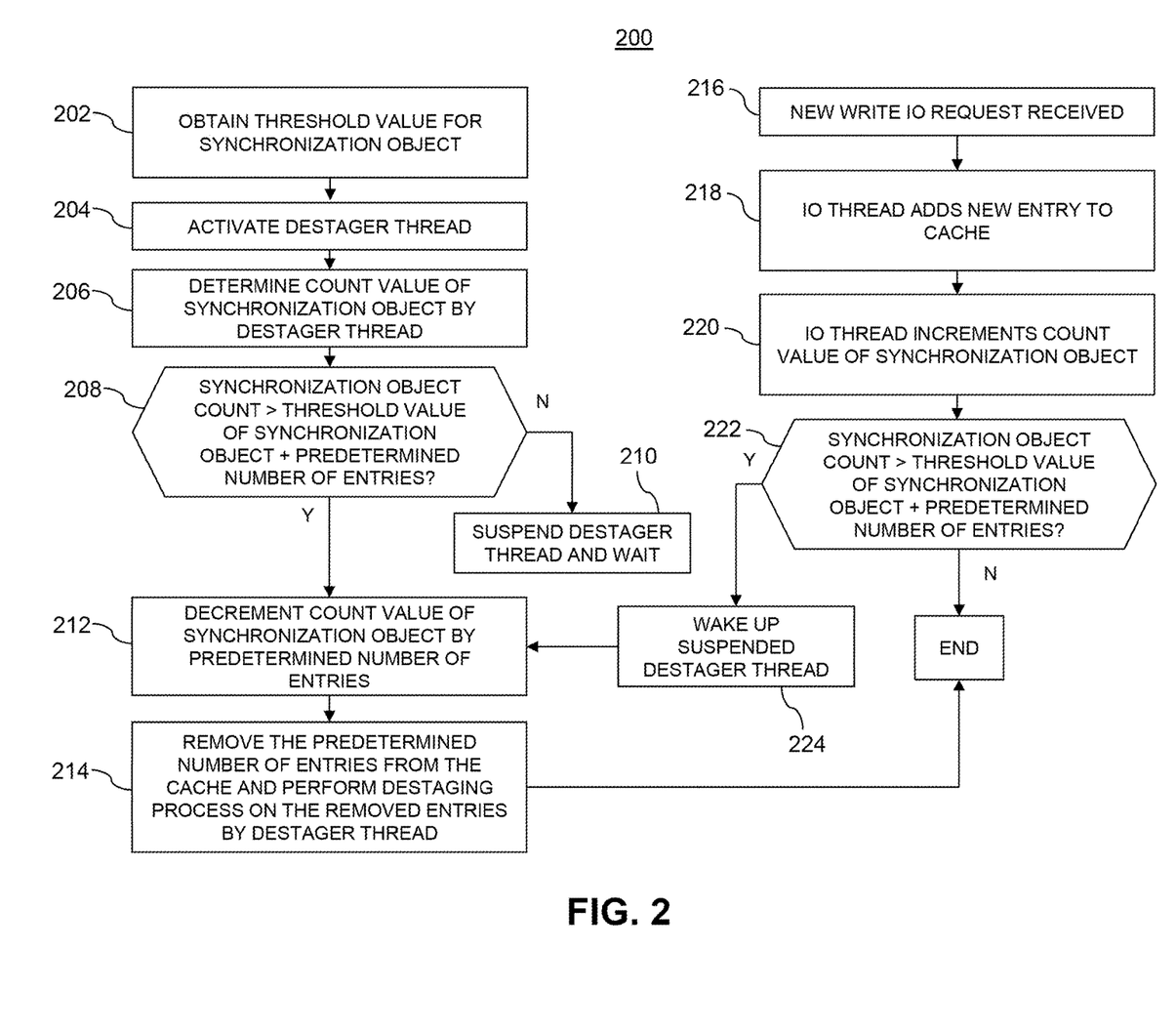
FIG. 2 is a flow diagram of a process for servicing IO requests and destaging in an illustrative embodiment.

The storage controller 110 of storage system 105 in the FIG. 1 embodiment includes write cache destage logic 116 which is configured to control performance of a write cache destaging process such as that illustrated in the flow diagram of FIG. 2. In some embodiments, write cache destage logic 116 may include a destager queue 118, destager threads 120, and a synchronization object 122.

Destager queue 118 is configured to track the entries found in write cache 108. For example, destager queue 118 may be a data structure that stores items of information or data about the entries found in write cache 108. In some embodiments, the items may be metadata. In some embodiments, the items may be pointers back to the entries of the write cache 108. In some embodiments, the items may be a list of what entries are currently stored in write cache 108.

Destager threads 120 are controller threads that are configured to perform the destaging process by hardening entries stored in the write cache 108 to a persistent data storage location, e.g., storage devices 106.

Synchronization object 122 includes a synchronization object count 124 and a synchronization object threshold value 126, e.g., a watermark level. In some embodiments, synchronization object 122 may be a semaphore with extended functionality to include the synchronization object threshold value 126.

Synchronization object count 124 may be a count of the items of information or data found in the destager queue 118 that corresponds to the entries in the write cache 108. In some embodiments, the synchronization object count 124 may be a direct count of the number of entries found in the write cache 108. Synchronization object count 124 may be incremented, for example, as new entries are added to the write cache or new items are added to the destager queue 118 and may be decremented, for example, as entries are removed from the write cache 108 and corresponding items of information or data are removed from the destager queue 118, e.g., due to a destaging process being performed by one or more of the destager threads 120. In some embodiments, synchronization object count 124 may be incremented by IO threads servicing IO requests where, for example, as an IO thread adds a new entry to the write cache, the IO thread may increment the synchronization object count 124.

Synchronization object threshold value 126 may be a value, e.g., a watermark, that may be checked against or compared to the synchronization object count 124 by a destager thread 120 to determine whether to perform a destaging process. In some embodiments, synchronization object threshold value 126 may be a predetermined value set by or obtained from the storage system 105, for example, upon startup or reboot. In some embodiments, synchronization object threshold value 126 may be dynamic where, for example, the threshold value may be adjusted or modified by storage system 105 as needed. In some embodiments, the synchronization object threshold value 126 may be obtained from a user input.

The storage controller 110 and storage system 105 should also be understood to include additional modules and other components typically found in conventional implementations of storage controllers and storage systems, although such additional modules and other components are omitted from the figure for clarity and simplicity of illustration.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 4 and 5.

It is to be appreciated that these and other features of illustrative embodiments are presented by way of example only and should not be construed as limiting in any way.

Accordingly, different numbers, types and arrangements of system components such as host devices 102, network 104, storage system 105, storage devices 106, write cache 108, storage controller 110 and datasets 112 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for the write cache destaging process can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

Some implementations of a write cache watermark-based destager in a storage cluster may involve the performance of two separate actions based on a count of the number of items found in a destager queue which corresponds to the number of entries found in a corresponding write cache.

The first action is a check against the count of the destager queue to determine whether the count is above a threshold value, e.g., a watermark value. If the count is not above the threshold value, the checking entity, e.g., a thread of a controller, idles before checking again, typically for a predetermined period of time, predetermined number of clock cycles, or other similar time for idling. If the count is above the watermark value, the checking entity may initiate a destaging process for the write cache.

The second action is a check against the count of the destager queue to determine whether there are enough entries to provide good aggregation to sufficiently and efficiently destage the write cache. If there are not enough entries, the checking entity, e.g., a thread of the controller, waits or idles until there are enough entries. If there are enough entries, the checking entity may perform or trigger the destaging process for the write cache.

Because a typical destager implementation takes both of these actions separately, they are often prone to idle spinning and different types of race conditions that may reduce the overall destager efficiency and performance, for example, by making the destager behavior unpredictable or irregular and by causing jittering in the system.

In some storage clusters that implement a write cache for temporarily storing and caching written data, write cache entries may be destaged by background destager threads. In such a system, there may be competing goals involved when making a determination on whether or not to destage some or all of the write cache.

For example, one goal may be to postpone destaging of write cache for as long as possible. This may be desirable since the longer the write cache retains a particular entry, the higher the probability that a new IO request will be received that updates or overwrites that entry or requests to read that entry before that entry is destaged. By postponing destaging, processing resources won't be wasted hardening the entry prior to the entry being overwritten or modified by the later IO request, or the later IO request to read the entry may be serviced directly from cache without requiring loading of data from the persistent storage into cache first. This increases the efficiency of the system since the processing resources that were not wasted may instead be used for other tasks.

Another goal may be to destage entries at a reasonable rate to guarantee that the write cache has a sufficient number of free entries to support ongoing IO requests. This may be important since the number of entries that a write cache can temporarily store is often limited.

To satisfy both of these goals, watermark based destager logic may be implemented. For example, a destager thread may be disabled or idle if the count of the number of items in the destager queue, e.g., corresponding to the number of entries in the write cache, is less than some threshold value, e.g., a watermark value. When the count of the number of entries in the destager queue exceeds the threshold value, a destager thread may begin the destaging process, for example, by taking a predetermined number of entries from the write cache and hardening them to a persistent data location.

An example of such destaging logic may be implemented as follows:
1. Compare a count of the number of entries in the destager queue with the threshold value and, if below the threshold value, sleep the thread for a predetermined amount of time and check again (i.e., repeat step 1).
2. If the count is above the threshold value, decrement the count of the destager queue by a predetermined number of entries, remove the predetermined number of entries from the write cache/destager queue, and harden the removed entries in the persistent data location. In some cases, the thread may wait if the destager queue does not include a sufficient number of entries to have the predetermined number of entries removed.
3. Return to step 1 and continue checking the count to determine whether to destage the write cache again.

However, this kind of destaging logic may in some cases have the following problems:
1. Idle spinning: a thread continuously idles and compares the count to the threshold value which results in a potential waste of processing resources.
2. Race conditions: several destager threads may check the count of the destager queue against the threshold value simultaneously. If the count is greater than the threshold, each of the threads may pass the check successfully at the same time and may begin destage processing even though there may only be enough entries above the threshold value for one of the threads to destage before the count falls back below the threshold value. This may result in a situation where too many entries in the write cache are destaged and the number of entries in the write cache can fall well below the threshold value or even to zero due to excessive destaging. This kind of race condition between multiple destager threads may reduce the overall efficiency and performance of the controller, and the destager component in particular, making its behavior unpredictable and jittered.

The above problems may be solved by synchronization object 122 which may be used to inhibit or prevent such idle spinning and race conditions.

In some embodiments, the individual destager threads 120 may check the value of the synchronization object count 124 to determine whether or not to destage the write cache 108. For example, as part of the destager thread logic, the value of synchronization object count 124 may be compared to the synchronization object threshold value 126 plus a predetermined number of entries in a single operation. If the synchronization object count 124 does not exceed the synchronization object threshold value 126 plus the predetermined number of entries, the destager thread 120 may be added to a wait queue of the synchronization object 122 and may be suspended or idle until the logic of the synchronization object 122 wakes up the destager thread 120 in response to a change or other operation of the synchronization object, e.g., an increment of the synchronization object count 124, an increment of the synchronization object count 126 above the synchronization object threshold value 126 plus the predetermined number of entries, or other changes or operations of the synchronization object 122.

In some embodiments, the synchronization object threshold value 126 of the synchronization object 122 may have the same value as the threshold value described above with respect to the destager queue. In some embodiments, the synchronization object threshold value 126 of the synchronization object 122 may be a different value than the threshold value for the destager queue described above. In some embodiments, the synchronization object threshold value 126 of the synchronization object 122 may be obtained from a user, e.g., via a user input.

In some embodiments, the predetermined number of entries may be a batch size for a single destaging process, i.e., the number of entries that are destaged in a single destaging process by an individual destager thread 120. In some embodiments, the predetermined number of entries may correspond to the block size at which data is stored in the persistent data storage location, e.g., storage devices 106. In some embodiments, the predetermined number of entries may be set to another value, e.g., double the batch size, triple the batch size, etc.

If the synchronization object count 124 exceeds the synchronization object threshold value 126 plus the predetermined number of entries, the destager thread 120 decrements the synchronization object count 124 by the predetermined number of entries and performs destaging by removing the predetermined number of entries from the write cache and destager queue 118 and persisting them to the persistent data storage location, e.g., storage device 106. For example, if the destager thread 120 is queued in the wait queue of the synchronization object 122, an increment of the synchronization object count 124 may wake up the destager thread 120 to perform the decrement and destaging.

The use of synchronization object 122 allows each individual destager thread 120 to check the synchronization object count 124 for both the "above threshold value", e.g., above synchronization object threshold value 126, and "enough entries to decrement", e.g., plus the predetermined number of entries, conditions at the same time, and if both conditions are not satisfied, to wait in a wait queue of the synchronization object. The destager thread 120 may wake up from the wait queue by the synchronization object 122 when a change in state of the synchronization object occurs, e.g., the synchronization object count 124 is incremented, or when another action in the synchronization object occurs such as, e.g., another thread waking the destager thread up from the wait queue. If both conditions are initially satisfied, or the destager thread has waited on the wait queue until both conditions are satisfied and is woken up, the destager thread 120 decrements the synchronization object count 122 atomically within the framework of a single operation.

Since an individual destager thread 120 performs both the check and the decrement functions together atomically and also waits in the wait queue when both conditions are not satisfied, the synchronization object count 124 will be decremented by the individual destager thread 120 before the next destager thread 120 checks it against the synchronization object threshold value 126 plus predetermined number of entries, or wakes up to perform destaging when both conditions are satisfied after waiting in the wait queue. This atomic check and decrement of the synchronization object count 124 inhibits race conditions between destager threads 120. For example, in some embodiments, access to the synchronization object 122 may be restricted to one of the destager threads 120 at a time.

The wait queue of the semaphore also inhibits idle spinning since each destager thread does not periodically check the synchronization object count 124 against the synchronization object threshold value 126 plus the predetermined number of entries, but instead idles or suspends while waiting in the wait queue until synchronization object 122 or another thread accessing synchronization object 122 wakes up the destager thread, for example, in response to an increment of the synchronization object count 124 or both conditions being satisfied.

In some embodiments, the synchronization object 122 may be implemented, for example, by extending a regular semaphore object through the addition of a watermark field and extending the regular semaphore application programming interface (API) by adding a new Semaphore_Decrement_with_Watermark(size) API in addition to regular Semaphore_Decrement(size) API and adding further supporting functionality to the regular Semaphore_Increment (size) API as set forth in the following example pseudocode modules.

```
Semaphore_Decrement_with_Watermark(size)
{
    IF (Semaphore_Count >= (size + Semaphore_Watermark))
        Semaphore_Count = Semaphore_Count − size
    ELSE
        Suspend myself and wait until the condition above is satisfied
}
```

The above pseudocode provides an example of specialized decrement functionality for the extended semaphore object which is more generic than the regular semaphore functionality. For example, the functionality of a regular semaphore object may be the case where Semaphore_Watermark is set to 0. As can be seen from the pseudocode, the Semaphore_Count, e.g., the synchronization object count 124, only decrements when it is greater than or equal to the input value "size", e.g., the predetermined number of entries, plus the "Semaphore_Watermark", e.g., the synchronization object threshold value 126. As an example, the input value "size" may be the predetermined number of entries, the batch size for the decrement process, or any other value. If both of the conditions are not satisfied, the destager thread calling the Semaphore_Decrement with Watermark(size) will suspend and wait until the conditions are satisfied, e.g., by being added to the wait queue of the synchronization object.

```
Semaphore_Increment( )
{
    IF (waiter_thread is waiter for
    Semaphore_Decrement_with_Watermark( ))
        ___watermark___ = Semaphore_Watermark
    ELSE
        ___watermark___ = 0 /* waiter thread used regular
    Semaphore_Decrement( ) method */
```

-continued

```
    IF (Semaphore_Count >= (waiter_count + ___watermark___))
        Semaphore_Count = Semaphore_Count − waiter_count
        Wake UP waiter_thread
    ELSE
        Break
}
```

The above pseudocode provides an example of specialized increment functionality for the extended semaphore object. As can be seen from the first IF/ELSE portion of the pseudocode, when a thread is waiting for the specialized decrement functionality, e.g., a destager thread is waiting in the wait queue of the semaphore and suspended, the_watermark_variable is set to the Semaphore_Watermark, e.g., synchronization object threshold value 126. For example, if the thread is not a destager thread, the watermark variable is set to 0, signifying that the regular semaphore logic is to be used. While described in the context of a destager thread, any other thread may utilize the watermark logic and set the watermark variable to a value other than 0.

As can be seen from the second IF/ELSE portion of the pseudocode, the Semaphore_Count, e.g., the synchronization object count 124, only decrements when it is greater than or equal to the waiter_count, e.g., the batch size number of entries destaged by an individual destager thread when in the context of destager functionality, plus the_ watermark_, e.g., the synchronization object threshold value 126 when the thread is a destager thread. The waiter_thread, e.g., destager thread 120, may also wake up if the Semaphore_Count is greater than or equal to the waiter_count plus the_watermark_, e.g., another thread may wake up the waiter_thread, and may execute the Semaphore_Decrement_with_Watermark(size) functionality.

A Semaphore_Set_Watermark(watermark) function may also be implemented that sets or obtains the value of the watermark, e.g., synchronization object threshold value 126, for example, to a predetermined amount, to a value input by a user, or in any other manner.

The logic of a destager thread based on the above pseudocode functions may be implemented as follows:

1. Semaphore_Decrement_with_Watermark(Batch_Size).
2. Remove Batch_Size entries from the destager queue and perform a destaging process on them.
3. Continue with the next cycle (go to 1.)

For example, a given destager thread will wait on the synchronization object 122, e.g., semaphore, until the synchronization object count 124, e.g., Semaphore_Count, is greater than or equal to the synchronization object threshold value 126, e.g., Semaphore_Watermark, plus the predetermined number of entries, e.g., Batch_Size, to allow for a predetermined number of entries, e.g., batch size number of entries, to be removed from the write cache. The synchronization object 122 or another thread accessing the synchronization object 122 may then wake up the given destager thread from the wait queue of the synchronization object and decrement the synchronization object count 124 by the predetermined number of entries and perform destaging on the write cache for the predetermined number of entries. Thus, the synchronization object inhibits idle spinning and race conditions from occurring.

The operation of the information processing system 100 will now be described in further detail with reference to the flow diagram of the illustrative embodiment of FIG. 2. The process 200 as shown includes steps 202 through 224 and is suitable for use in system 100 but is more generally applicable to other types of information processing systems in which a storage system is configured to destage a write cache. The steps are illustratively performed at least in part under the control of the write cache destage logic 116 in storage system 105 of system 100.

In step 202, the synchronization object threshold value 126 is set or obtained, for example, by the storage controller 110.

In step 204, the storage controller 110 may activate a destager thread 120. For example, in some embodiments, destager threads 120 may be activated by storage controller 110 in response to a system startup, reboot, or any other activity and may be running in the background.

In step 206, an activated destager thread 120 may determine the value of the synchronization object count 124, for example, by reading the value from the synchronization object 122, querying storage controller 110 for the value, or in other similar manners.

In step 208, the activated destager thread 120 compares the value of the synchronization object count 124 to the synchronization object threshold value 126 plus the predetermined number of entries. If the value of the synchronization object count 124 does not exceed the synchronization object threshold value 126 plus the predetermined number of entries, the process proceeds to step 210 and suspends the destager thread. In some embodiments, for example, the destager thread is suspended and added to a wait queue of the synchronization object 122.

With reference back to step 208, if the value of the synchronization object count 124 exceeds the synchronization object threshold value 126 plus the predetermined number of entries, the process proceeds to step 212 and the destager thread 120 decrements the value of the synchronization object count 124 by the predetermined number of entries.

In step 214, the destager thread 120 removes the predetermined number of entries from the write cache 108 and performs a destaging process on the removed entries, e.g., by hardening them in a persistent data location such as, e.g., storage devices 106 and the process ends. In some embodiments, the activated destager thread 120 may also update the destager queue 118 to reflect the removed entries, e.g., by removing the items of information or data corresponding to the removed entries from the destager queue 118.

When the storage controller 110 receives a new write IO request in step 216, the storage controller 110 generates an IO thread to service the write IO request.

In step 218, the IO thread adds one or more new entries associated with the write IO request to the cache 108 and may update the destager queue 118 for the one or more new entries.

In step 220, the IO thread increments the value of synchronization object count 124 by an amount corresponding to the number of the newly added one or more new entries.

In step 222, the IO thread compares the value of the synchronization object count 124 to the synchronization object threshold value 126 plus the predetermined number of entries. If the value of the synchronization object count 124 does not exceed the synchronization object threshold value 126 plus the predetermined number of entries, the process ends.

If the value of the synchronization object count 124 exceeds the synchronization object threshold value 126 plus the predetermined number of entries, the IO thread may wake up a suspended destager thread 120 in step 224. For example, destager threads 120 may be suspended and waiting in a wait queue of the synchronization object 122, for example, as set forth above with respect to step 210. For example, IO thread may wake up one or more of the destager threads waiting in the queue in response to the IO thread determining that the synchronization object count 124 exceeds the synchronization object threshold value 126 plus the predetermined number of entries. In some embodiments, the IO thread may wake up the first or head destager thread 120 in the queue first. The process then proceeds to 212 as described above.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 110 of storage system 105 that is configured to control performance of one or more steps of the FIG. 2 process in its corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 110, as well as other system components, may be implemented at least in part using processing devices of such processing platforms. For example, in a distributed implementation of the storage controller 110, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate write cache destage techniques as disclosed herein.

An illustrative embodiment of such a content addressable storage system will now be described with reference to FIG. 3. In this embodiment, a content addressable storage system 305 comprises a plurality of storage devices 306, a write cache 308, and an associated storage controller 310. The content addressable storage system 305 may be viewed as a particular implementation of the storage system 105, and accordingly is assumed to be coupled to host devices 102 of computer system 101 via network 104 within information processing system 100.

The write cache 308 in the present embodiment is configured to operate in a manner similar to that described above for write cache 108 of storage system 105.

The storage controller 310 in the present embodiment is configured to implement write cache destage functionality of the type previously described in conjunction with FIGS. 1 and 2.

The storage controller 310 includes write cache destage logic 316, which is configured to operate in a manner similar to that described above for write cache destage logic 116 of storage controller 110.

Figure 3:
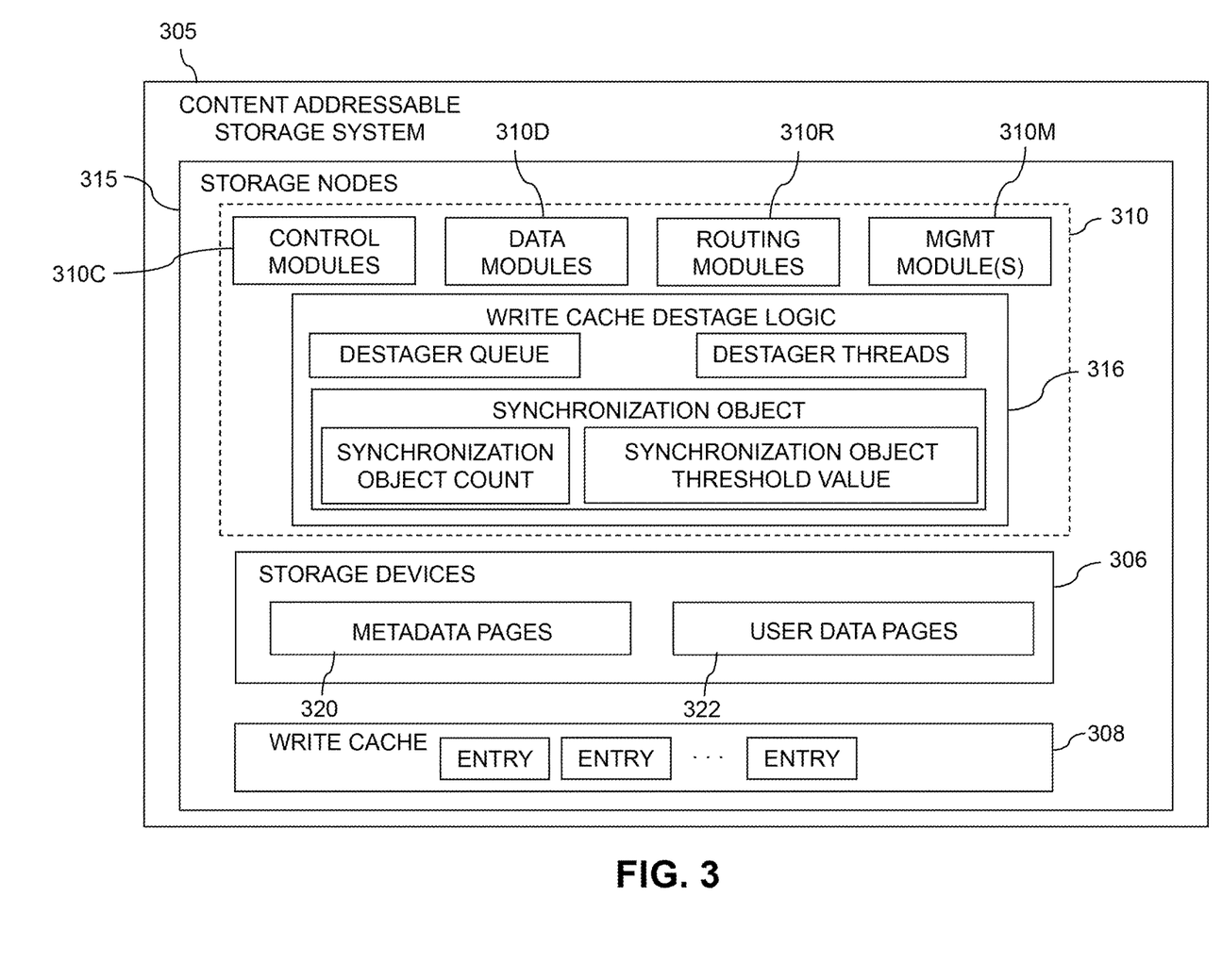
FIG. 3 shows a content addressable storage system having a distributed storage controller configured with functionality for performing destaging logic in an illustrative embodiment.

The content addressable storage system 305 in the FIG. 3 embodiment is implemented as at least a portion of a clustered storage system and includes a plurality of storage nodes 315 each comprising a corresponding subset of the storage devices 306. Other clustered storage system arrangements comprising multiple storage nodes can be used in other embodiments. A given clustered storage system may include not only storage nodes 315 but also additional storage nodes coupled to network 104. Alternatively, such additional storage nodes may be part of another clustered storage system of the system 100. Each of the storage nodes 315 of the storage system 305 is assumed to be implemented using at least one processing device comprising a processor coupled to a memory.

The storage controller 310 of the content addressable storage system 305 is implemented in a distributed manner so as to comprise a plurality of distributed storage controller components implemented on respective ones of the storage nodes 315. The storage controller 310 is therefore an example of what is more generally referred to herein as a "distributed storage controller." In subsequent description herein, the storage controller 310 may be more particularly referred to as a distributed storage controller.

Each of the storage nodes 315 in this embodiment further comprises a set of processing modules configured to communicate over one or more networks with corresponding sets of processing modules on other ones of the storage nodes 315. The sets of processing modules of the storage nodes 315 collectively comprise at least a portion of the distributed storage controller 310 of the content addressable storage system 305.

The modules of the distributed storage controller 310 in the present embodiment more particularly comprise different sets of processing modules implemented on each of the storage nodes 315. The set of processing modules of each of the storage nodes 315 comprises at least a control module 310C, a data module 310D and a routing module 310R. The distributed storage controller 310 further comprises one or more management ("MGMT") modules 310M. For example, only a single one of the storage nodes 315 may include a management module 310M. It is also possible that management modules 310M may be implemented on each of at least a subset of the storage nodes 315.

Each of the storage nodes 315 of the storage system 305 therefore comprises a set of processing modules configured to communicate over one or more networks with corresponding sets of processing modules on other ones of the storage nodes. A given such set of processing modules implemented on a particular storage node illustratively includes at least one control module 310C, at least one data module 310D and at least one routing module 310R, and possibly a management module 310M. These sets of processing modules of the storage nodes collectively comprise at least a portion of the distributed storage controller 310.

Communication links may be established between the various processing modules of the distributed storage controller 310 using well-known communication protocols such as IP, Transmission Control Protocol (TCP), and remote direct memory access (RDMA). For example, respective sets of IP links used in data transfer and corresponding messaging could be associated with respective different ones of the routing modules 310R.

Although shown as separate modules of the distributed storage controller 310, the write cache destage logic 316 in the present embodiment is assumed to be distributed at least in part over at least a subset of the other modules 310C, 310D, 310R and 310M of the storage controller 310. Accordingly, at least portions of the write cache destage logic 316 may be implemented in one or more of the other modules of the storage controller 310. In other embodiments, the write cache destage logic 316 may be implemented as stand-alone module of the storage controller 310.

The storage devices 306 are configured to store metadata pages 320 and user data pages 322 and may also store additional information not explicitly shown such as checkpoints and write journals. The metadata pages 320 and the user data pages 322 are illustratively stored in respective designated metadata and user data areas of the storage devices 306. Accordingly, metadata pages 320 and user data pages 322 may be viewed as corresponding to respective designated metadata and user data areas of the storage devices 306.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 320 and the user data pages 322.

The user data pages 322 are part of a plurality of logical unit numbers (LUNs) configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 322 can include any type of user data that may be utilized in the system 100. The term "user data" herein is therefore also intended to be broadly construed.

The content addressable storage system 305 in the embodiment of FIG. 3 is configured to generate hash metadata providing a mapping between content-based digests of respective ones of the user data pages 322 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 322. The hash metadata generated by the content addressable storage system 305 is illustratively stored as metadata pages 320 in the metadata area. The generation and storage of the hash metadata is assumed to be performed under the control of the storage controller 310.

Each of the metadata pages 320 characterizes a plurality of the user data pages 322. For example, a given set of user data pages representing a portion of the user data pages 322 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 306.

Each of the metadata pages 320 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 320 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 305 is illustratively distributed among the control modules 310C.

The write cache destage functionality provided by write cache destage logic 316 in this embodiment is assumed to be distributed across multiple distributed processing modules, including at least a subset of the processing modules 310C, 310D, 310R and 310M of the distributed storage controller 310.

For example, the management module 310M of the storage controller 310 may include write cache destage logic 316 that controls the control modules 310C and routing modules 310R in order to implement a write cache destage process.

In some embodiments, the content addressable storage system 305 comprises an XtremIO™ storage array suitably modified to incorporate techniques for performance of write cache destaging functions.

In arrangements of this type, the control modules 310C, data modules 310D and routing modules 310R of the distributed storage controller 310 illustratively comprise respective C-modules, D-modules and R-modules of the XtremIO™ storage array. The one or more management modules 310M of the distributed storage controller 310 in such arrangements illustratively comprise a system-wide management module ("SYM module") of the XtremIO™ storage array, although other types and arrangements of system-wide management modules can be used in other embodiments. Accordingly, write cache destaging functionality in some embodiments is implemented under the control of at least one system-wide management module of the distributed storage controller 310, utilizing the C-modules, D-modules and R-modules of the XtremIO™ storage array.

In the above-described XtremIO™ storage array example, each user data page has a fixed size such as 8KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein in their entirety.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 310C such that control of the slices within the storage controller 310 of the storage system 305 is substantially evenly distributed over the control modules 310C of the storage controller 310.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 305 each illustratively comprise one or more IO operations directing that at least one data item of the storage system 305 be written to in a particular manner. A given write request is illustratively received in the storage system 305 from a host device, illustratively one of the host devices 102. In some embodiments, a write request is received in the distributed storage controller 310 of the storage system 305 and directed from one processing module to another processing module of the distributed storage controller 310. For example, a received write request may be directed from a routing module 310R of the distributed storage controller 310 to a particular control module 310C of the distributed storage controller 310. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO$^{SM}$ context, the C-modules, D-modules and R-modules of the storage nodes 315 communicate with one another over a high-speed internal network such as an InfiniBand network. The C-modules, D-modules and R-modules coordinate with one another to accomplish various IO processing tasks.

The write requests from the host devices identify particular data pages to be written in the storage system 305 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 305 utilizes a two-level mapping process to map logical block addresses to physical block addresses. The first level of mapping uses an address-to-hash ("A2H") table and the second level of mapping uses a hash metadata ("HMD") table, with the A2H and HIVID tables corresponding to respective logical and physical layers of the content-based signature mapping within the storage system 305.

The first level of mapping using the A2H table associates logical addresses of respective data pages with respective content-based signatures of those data pages. This is also referred to logical layer mapping.

The second level of mapping using the HIVID table associates respective ones of the content-based signatures with respective physical storage locations in one or more of the storage devices 306. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 305 correspond to respective physical blocks of a physical layer of the storage system 305. The user data pages of the logical layer are organized by LBA and have reference via respective content-based signatures to particular physical blocks of the physical layer.

Each of the physical blocks has an associated reference count that is maintained within the storage system 305. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 310C, 310D, 310R and 310M as shown in the FIG. 3 embodiment is presented by way of example only. Numerous alternative arrangements of processing modules of a distributed storage controller may be used to write cache destage functionality in other embodiments.

Additional examples of content addressable storage functionality implemented in some embodiments by control modules 310C, data modules 310D, routing modules 310R and management module(s) 310M of distributed storage controller 310 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with write cache destage functionality will now be described in greater detail with reference to FIGS. 4 and 5. Although described in the context of system 100, these platforms may also be used to implement at least portions of other information processing systems in other embodiments.

Figure 4:
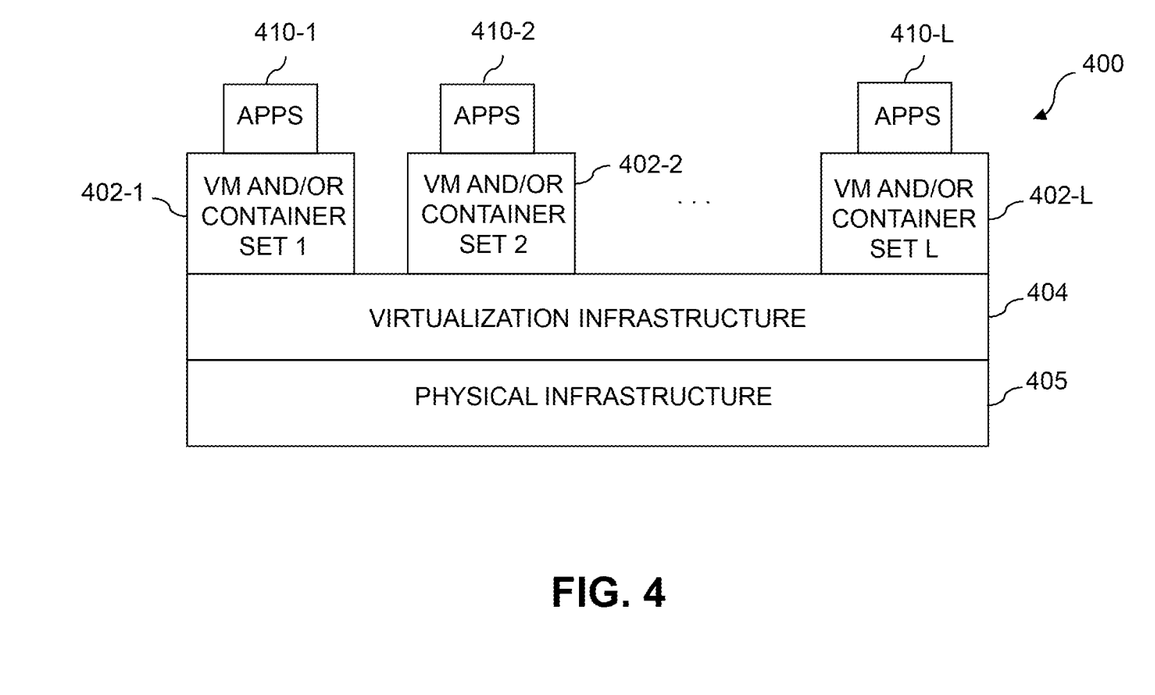
FIGS. 4 and 5 show examples of processing platforms that may be utilized to implement at least a portion of an information processing system in illustrative embodiments.
Figure 5:
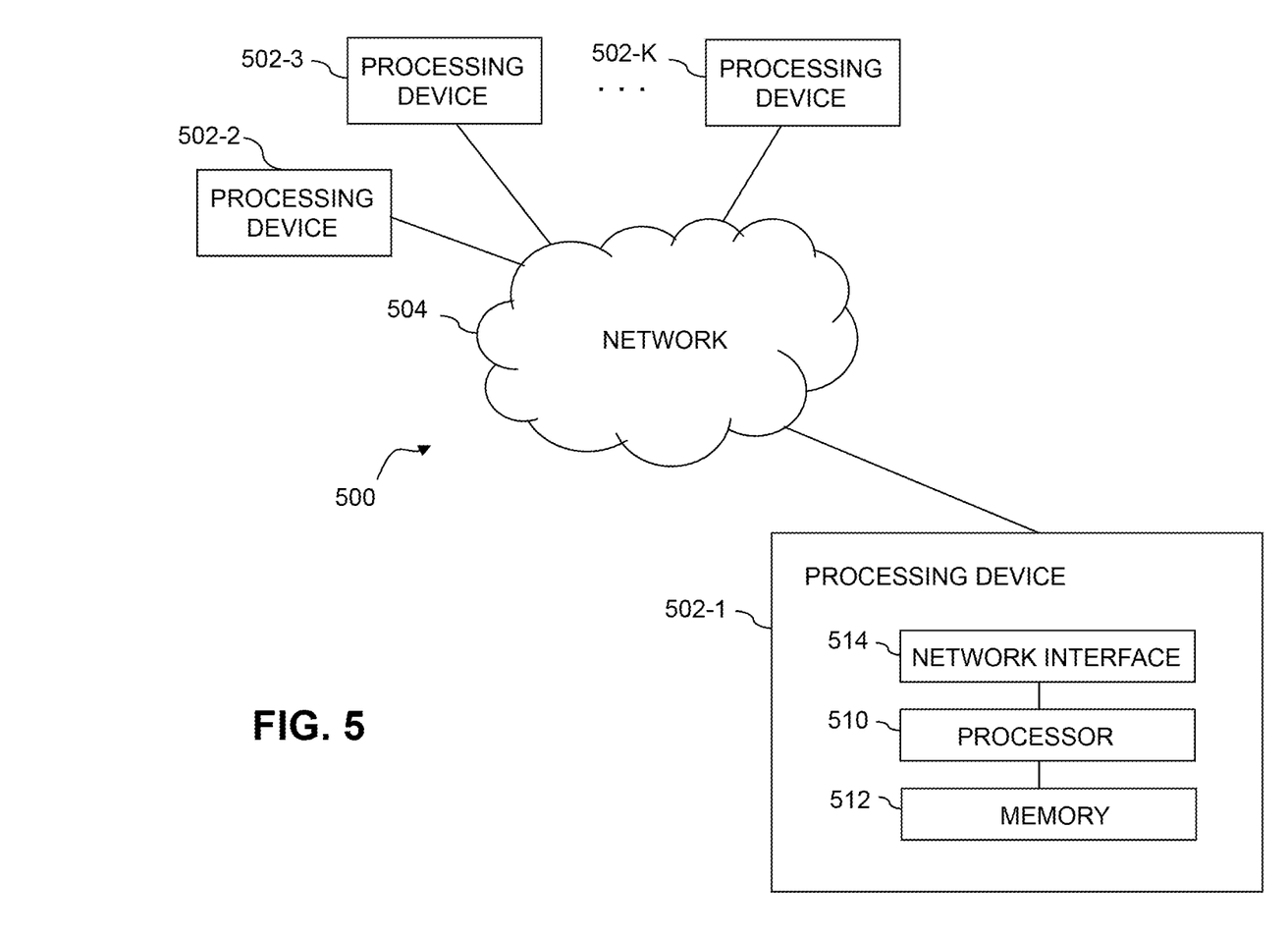

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide write cache destage functionality of the type described above for one or more processes running on a given one of the VMs. For example, each of the VMs can implement write cache destage logic for providing write cache destage functionality in the system 100.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can also provide write cache destage functionality of the type described above. For example, a container host device supporting multiple containers of one or more container sets can implement one or more instances of write cache destage logic for use in destaging the write cache.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the write cache destage functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, write cache destage processes and associated control logic and tables. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
 a storage system comprising a plurality of storage devices, a data structure associated with at least one of the plurality of storage devices, and a storage controller associated with the data structure and the plurality of storage devices;
 wherein the storage controller is configured to:
  obtain a threshold value for a synchronization object associated with the data structure; and
  activate a plurality of threads, each thread configured to:
   determine a count value of the synchronization object, the count value corresponding to a number of entries in the data structure;
   determine whether the count value of the synchronization object exceeds the threshold value plus a predetermined number of entries; and
   destage a number of entries of the data structure equal to the predetermined number of entries in response to determining that the count value of the synchronization object exceeds the threshold value plus the predetermined number of entries.

2. The apparatus of claim 1, wherein access to the synchronization object is restricted to one of the threads at a time.

3. The apparatus of claim 1, wherein a given thread of the plurality of threads is further configured to suspend in response to determining that the count value of the synchronization object does not exceed the threshold value plus the predetermined number of entries.

4. The apparatus of claim 3, wherein the storage controller is further configured to:
 update the count value of the synchronization object; and
 wake up the given thread in response to the update of the count value of the synchronization object, the given thread further configured to:
  determine the count value of the synchronization object;
  determine whether the count value of the synchronization object exceeds the threshold value plus the predetermined number of entries; and
  destage the number of entries of the data structure equal to the predetermined number of entries in response to determining that the count value of the synchronization object exceeds the threshold value plus the predetermined number of entries.

5. The apparatus of claim 1,
 wherein the data structure is a cache storing data to be written to at least one of the plurality of storage devices,
 wherein the plurality of threads comprise a plurality of destager threads, and
 wherein destaging the number of entries of the data structure equal to the predetermined number of entries comprises at least one of the destager threads:
  destaging a number of entries of the cache equal to the predetermined number of entries; and
  updating the count value of the synchronization object in response to the destaging.

6. The apparatus of claim 5, wherein updating the count value of the synchronization object in response to the destaging comprises decrementing the count value of the synchronization object by the predetermined number of entries.

7. The apparatus of claim 5, wherein the storage controller is further configured to:
 receive a write IO request from a host device;
 add at least one entry to the cache based on the received write IO request; and
 increment the count value of the synchronization object by an amount corresponding to the number of entries added to the cache based on the received write IO request.

8. The apparatus of claim 7, wherein the storage controller is configured to:
 maintain a destager queue comprising at least one item, each item corresponding to an entry in the cache,
 wherein, incrementing the count value of the synchronization object corresponding to the number of entries added to the cache based on the received write IO request comprises incrementing the count value of the synchronization object corresponding to the number of items in the destager queue.

9. The apparatus of claim 8, wherein destaging the number of entries of the cache equal to the predetermined number of entries comprises removing the corresponding items from the destager queue.

10. A method comprising:
 obtaining a threshold value for a synchronization object associated with a data structure associated with a plurality of storage devices; and
 activating a plurality of threads, each thread:
  determining the count value of the synchronization object, the count value corresponding to a number of entries in the data structure;
  determining whether the count value of the synchronization object exceeds the threshold value of the synchronization object plus a predetermined number of entries; and
  destaging a number of entries of the data structure equal to the predetermined number of entries in response to determining that the count value of the synchronization object exceeds the threshold value plus the predetermined number of entries,
 wherein the method is implemented by at least one processing device comprising a processor coupled to a memory.

11. The method of claim 10, wherein access to the synchronization object is restricted to one of the threads at a time.

12. The method of claim 10, wherein a given thread of the plurality of threads is further configured to suspend in response to determining that the count value of the synchronization object does not exceed the threshold value plus the predetermined number of entries.

13. The method of claim 12, wherein the storage controller is further configured to:
 update the count value of the synchronization object; and
 wake up the given thread in response to the update of the count value of the synchronization object, the given thread further configured to:
  determine the count value of the synchronization object;
  determine whether the count value of the synchronization object exceeds the threshold value plus the predetermined number of entries; and
  destage the number of entries of the data structure equal to the predetermined number of entries in response to determining that the count value of the synchronization object exceeds the threshold value plus the predetermined number of entries.

14. The method of claim 10,
wherein the data structure is a cache storing data to be written to at least one of the plurality of storage devices,
wherein the plurality of threads comprise a plurality of destager threads, and
wherein destaging the number of entries of the data structure equal to the predetermined number of entries comprises at least one of the destager threads:
- destaging a number of entries of the cache equal to the predetermined number of entries; and
- updating the count value of the synchronization object in response to the destaging.

15. The method of claim 14, wherein updating the count value of the synchronization object in response to the destaging comprises decrementing the count value of the synchronization object by the predetermined number of entries.

16. The method of claim 14, wherein the method further comprises:
- receiving a write IO request from a host device;
- adding at least one entry to the cache based on the received write IO request; and
- incrementing the count value of the synchronization object by an amount corresponding to the number of entries added to the cache based on the received write IO request.

17. The method of claim 16, wherein the method further comprises:
- maintaining a destager queue comprising at least one item, each item corresponding to an entry in the cache,
- wherein, incrementing the count value of the synchronization object corresponding to the number of entries added to the cache based on the received write IO request comprises incrementing the count value of the synchronization object corresponding to the number of items in the destager queue.

18. The method of claim 17, wherein destaging the number of entries of the cache equal to the predetermined number of entries comprises removing the corresponding items from the destager queue.

19. A computer program product comprising a non-transitory processor-readable storage medium having stored therein program code of one or more software programs, wherein the program code when executed by at least one processing device causes said at least one processing device to:
- obtain a threshold value for a synchronization object associated with a data structure associated with at least one of a plurality of storage devices; and
- activate a plurality of threads, each thread configured to:
  - determine a count value of the synchronization object, the count value corresponding to a number of entries in the data structure;
  - determine whether the count value of the synchronization object exceeds the threshold value plus a predetermined number of entries; and
  - destage a number of entries of the data structure equal to the predetermined number of entries in response to determining that the count value of the synchronization object exceeds the threshold value plus the predetermined number of entries.

20. The computer program product of claim 19,
wherein the data structure is a cache storing data to be written to at least one of the plurality of storage devices,
wherein the plurality of threads comprise a plurality of destager threads, and
wherein destaging the number of entries of the data structure equal to the predetermined number of entries comprises at least one of the destager threads:
- destaging a number of entries of the cache equal to the predetermined number of entries; and
- updating the count value of the synchronization object in response to the destaging.

* * * * *